United States Patent [19]

Hager

[11] Patent Number: 4,685,174
[45] Date of Patent: Aug. 11, 1987

[54] SHOCK ABSORBING CASTER WHEEL SUSPENSION WITH FRICTIONAL VERTICAL OSCILLATION DAMPENING

[76] Inventor: Clarence H. Hager, 3408 Corbridge La., Rockford, Ill. 61107

[21] Appl. No.: 366,825

[22] Filed: Apr. 9, 1982

[51] Int. Cl.[4] .............................................. B60B 33/00
[52] U.S. Cl. .................................. 16/44; 16/DIG. 36; 188/381; 267/178; 267/216; 280/78; 280/701
[58] Field of Search ................ 16/18 B, 44, 337, 342, 16/DIG. 36; 280/78, 79, 701; 188/381; 267/20 R, 20 A, 178

[56] References Cited

U.S. PATENT DOCUMENTS

| | | | |
|---|---|---|---|
| 2,087,299 | 7/1937 | Pribil | 16/44 |
| 2,738,542 | 3/1956 | Clark, Jr. | 16/44 |
| 2,753,946 | 7/1956 | Quayle | 16/44 X |
| 2,830,545 | 4/1958 | Robinson et al. | 16/18 CG |
| 3,041,656 | 7/1962 | Goodall | 16/31 R X |
| 3,066,950 | 12/1962 | Olson et al. | 16/44 X |
| 3,173,707 | 3/1965 | Peras | 280/701 |
| 3,254,899 | 6/1966 | Voorhies | 280/701 X |
| 3,518,714 | 7/1970 | Hager . | |
| 3,747,950 | 7/1973 | Hager . | |
| 3,871,032 | 12/1973 | Jones | 280/701 |
| 4,351,636 | 9/1982 | Hager | 474/135 |

FOREIGN PATENT DOCUMENTS 1347864 11/1963 France ................................ 280/701

Primary Examiner—Fred Silverberg
Attorney, Agent, or Firm—Vernon J. Pillote

[57] ABSTRACT

A shock absorbing caster wheel in which the wheel support bracket is pivotally mounted on a caster bracket and a spring engages the wheel support bracket and caster bracket to absorb shocks on the caster wheel. Vibration dampening pads on the caster bracket slidably engage wall surfaces on the wheel support bracket to dampen oscillation of the wheel support bracket.

12 Claims, 3 Drawing Figures

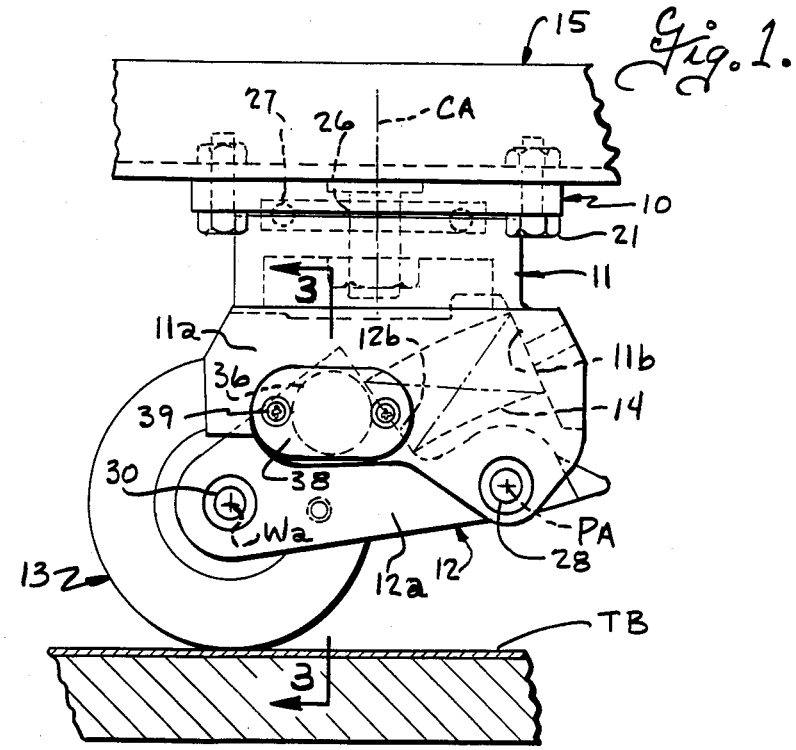
Fig. 1.
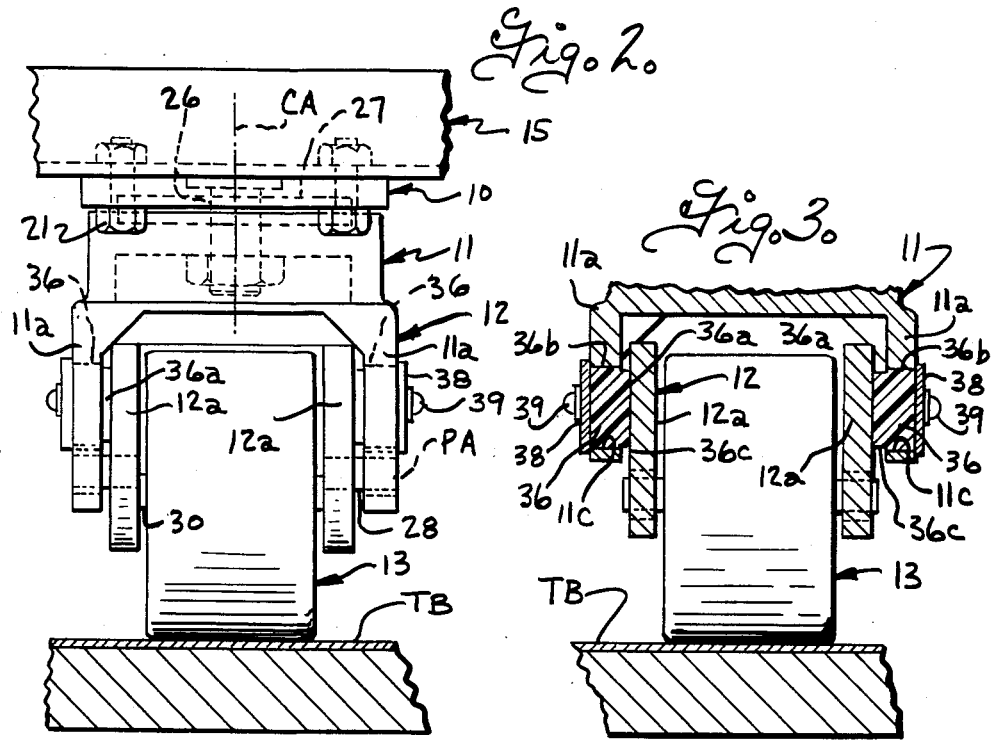
Fig. 2.
Fig. 3.

SHOCK ABSORBING CASTER WHEEL SUSPENSION WITH FRICTIONAL VERTICAL OSCILLATION DAMPENING

BACKGROUND OF THE INVENTION

Caster wheels are commonly used on industrial trucks and dollies and on some equipment to facilitate movement of goods and equipment from place to place. The wheels on such caster wheel suspensions are subjected to relatively high impact forces when they engage an obstruction, which impact forces increase as a function of increasing speed and weight or load, and decreasing wheel radius. Shock absorbing caster wheel suspensions such as disclosed in U.S. Pat. Nos. 2,738,542; 3,518,714 and 3,747,950 have heretofore been provided to reduce the transmission of impact forces from the ground engaging wheels to the suspension and to the load or equipment supported thereby. It has also been proposed, for example as shown in U.S. Pat. No. 3,066,950, to transport goods or equipment on over-the-road vehicles, while the goods or equipment are supported by shock absorbing wheel suspensions that rest on the bed of the over-the-road truck or trailer. The shock absorbing wheel suspensions used to support the load or equipment on the bed of the truck, function to absorb shock loads transmitted by the bed of the truck to the wheel of the shock absorbing wheel suspension, and dynamic or "G" loads transmitted by the load or equipment to the shock absorbing wheel suspension. However, when shock absorbing wheel suspensions are used to support a load or equipment on the bed of an over-the-road vehicle such as a truck or trailer having its own spring suspension, it has been found that the load or equipment sometimes goes into heavy vibration which can be damaging to some types of goods and equipment. Thus, while the prior shock absorbing wheel suspensions are adapted to absorb and reduce transmission to the load or equipment of relatively high impact shocks of a random nature, a periodic disturbing force from the truck bed, even of a low amplitude, can produce very large forced vibration in the load or equipment supported on the suspension apparatus when the frequency of the disturbing force approaches the frequency of natural vibration of the shock absorbing wheel suspension and the goods or equipment supported thereby. It has heretofore been proposed to transport some delicate equipment such as electronic equipment only in over-the-road vehicles having air bag suspensions, such as those provided on some household moving vans, and which are adapted to minimize the vibrations that are transmitted to the bed of the van. However, this markedly increases the cost of transporting the equipment over that which would be incurred if the goods or equipment could be shipped as a part of a load on regular freight hauling trucks

SUMMARY OF THE INVENTION

It is an object of this invention to provide a shock absorbing wheel suspension for supporting goods or equipment which is not only adapted to absorb and reduce transmission of relatively high impact loads from the wheel of the suspension to the load or equipment supported thereby, but which is also effective to overcome resonant vibration problems encountered in the prior art shock absorbing wheel suspensions when they are used to support loads or equipment on the beds of over-the-road vehicles.

Accordingly, the present invention provides a shock absorbing wheel suspension for a mobile device comprising a mounting bracket means and means for attaching the mounting bracket means to a mobile device, a wheel support bracket mounted on the mounting bracket means for vertical swinging movement relative thereto about a generally horizontal pivot axis, a ground engaging wheel, means mounting the ground engaging wheel on the wheel support bracket for rotation about a generally horizontal wheel axis, and spring means engaging the wheel support bracket in the mounting bracket means resiliently urging the wheels downwardly. One of the items comprising the mounting bracket means and the wheel support bracket has a pair of oppositely facing wall surfaces disposed in planes generally perpendicular to the pivot axis and spaced radially outwardly therefrom, and a pair of vibration dampening pads each having a pad face are mounted on the other of the items with the pad faces at locations spaced outwardly from the pivot axis to slidably engage the respective ones of the opposite facing wall surfaces and with the pads pressed in a direction perpendicular to the respective pad face into pressurized engagement with a respective wall surface to dampen vertical oscillation of the wheel support bracket relative to the mounting bracket.

These, together with other objects and advantages of this invention will become apparent from the following description, taken in connection with the accompanying drawings wherein:

FIG. 1 is a side elevational view of a shock absorbing wheel suspension in accordance with the present invention shown mounted on an equipment carrier for transportation on the bed of an over-the-road vehicle;

FIG. 2 is an end elevational view of the shock absorbing wheel suspension of FIG. 1; and FIG. 3 is a fragmentary vertical sectional view.

In the preferred embodiment illustrated, the shock absorbing wheel suspension comprises a caster apparatus having a mounting base 10, a caster bracket 11 mounted on the mounting base for turning movement about an upright caster axis CA, a wheel support bracket 12 mounted on the mounting bracket for pivotal movement relative thereto about a generally horizontal pivot axis PA, and a ground engaging wheel 13 mounted on the wheel support bracket 12 for rotation about a generally horizontal wheel axis WA. A resilient spring means 14 is interposed between the caster bracket 11 and the wheel support bracket 12 to yieldably urge the wheel support bracket relative to the caster bracket in a direction to press the wheel 13 downwardly.

The shock absorbing wheel suspension is adapted to be attached either to a dolly 15 that forms a bed for supporting and transporting goods or equipment, or directly to the equipment to provide a shock absorbing wheel suspension therefor. The shock absorbing wheel suspension may, for example, be attached as by bolts 21 or other suitable fasteners to the dolly or to the equipment to provide a mobile support, and the caster bracket 11 is mounted as by a pivot bolt 26 on the mounting base 10 for turning movement relative to the mounting base about the caster axis CA. Anti-friction bearings such as indicated at 27 are advantageously provided between the mounting base and caster bracket. The caster bracket 11 has spaced side walls 11a and a transverse wall 11b (FIG. 1) that extends between the side walls and rigidly interconnects the same. The wheel support bracket 12 has spaced side walls 12a and a transverse wall 12b (FIG. 1) extending between the side walls and rigidly interconnecting the same. A portion of the side walls 12a of the wheel support bracket 12 extends between the side walls 11a of the caster bracket 11, and the wheel support bracket is pivotally supported on the side walls of the caster bracket by a horizontal pivot pin 28 that is horizontally offset to one side of the caster axis CA. The wheel 13 is disposed between the legs 12a of the wheel support bracket and is rotatably supported on a horizontal axle 30 on the side walls 12a of the wheel support bracket at a location horizontally offset from the caster axis CA at the side opposite the pivot axis PA. Thus, as the dolly or equipment is moved over a surface, the caster is adapted to swivel about the caster axis CA so that the wheel 13 trails during movement over a surface. The spring means 14 is arranged to absorb shocks applied to the wheel, as occurs when the wheel meets an obstruction during movement over a surface, and the spring means 14 preferably comprise one or more coil-type compression springs interposed between the transverse walls 11b and 12b on the caster bracket and wheel support bracket respectively. For reasons more fully described in U.S. Pat. No. 2,738,542, each compression spring is normally in the form of a straight cylinder having flat ends perpendicular to the axis of the cylinder, and the spring abutments formed by the transverse walls 11and 12b are preferably arranged so that they form an acute angle therebetween that progressively decreases as the wheel support bracket pivots about the pivot axis PA in a direction opposite the spring direction. With this arrangement, the normally straight compression spring having parallel end faces when undistended, becomes longitudinally arched as shown in the drawings when disposed between the abutments with its end faces seated against the same. A straight coil-type compression spring when compressed in a direction along its axis has a uniform spring rate. However, when a normally straight compression spring is disposed between abutment faces that are initially disposed at an acute angle to each other and which move toward a parallel position, the spring exhibits a variable spring rate which is initially lower than the spring rate of the straight spring and which progressively increases and becomes equal to the rate of the straight spring when the abutment faces move into parallelism. The spring means is preferably selected so that the caster apparatus operates in the curved or variable spring rate portion of the spring load deflection curve, when supporting its rated load.

The shock absorbing wheel suspension as thus far described is adapted to absorb random or non-periodic impact forces on the wheel, even of relatively high amplitude, such as occur when the wheel engages an obstruction or drops off a small ledge during movement of the dolly or equipment 15 over a surface such as floor. However, when the shock absorbing wheel suspension is utilized to support goods or equipment either on the dolly or directly on the shock absorbing wheel suspension, during transportation of the goods or equipment on the bed TB of an over the road vehicle such as a truck or trailer, the ground engaging wheels 13 of the suspension rest on the bed of the trailer and are subjected not only to random or non-periodic impact forces as the wheels of the over-the-road vehicle engage an obstruction, but also to periodic or repetitive forces such as occur when engaging periodic obstructions in a road at a high vehicle speed, and these periodic or recurring forces are transmitted through the truck bed TB to the shock absorbing wheel suspension. When the frequency of the disturbing force from the truck bed TB approaches the frequency of natural vibration of the shock wheel suspension and the load or equipment carried thereby, even relatively small disturbing forces can produce very large forced vibrations of the shock absorbing wheel suspension and equipment.

In accordance with the present invention, vibration dampening means is provided to control oscillation of the wheel support bracket 12 relative to the caster bracket 11 to inhibit resonant vibration of the shock absorbing wheel support apparatus and the load or equipment carried thereby. The vibration dampening means comprises a pair of vibration dampening pads 36 that are mounted on one of the items comprising the caster bracket and wheel support bracket and which have pad faces 36a disposed in planes perpendicular to the pivot axis PA and which engage wall surfaces on the side walls of the other of the items, which wall surfaces are also disposed generally perpendicular to the pivot axis PA. In the preferred embodiment illustrated, the vibration dampening pads 36 are mounted on the side walls 11a of the caster bracket and the pad faces 36a engage the outer faces of the side walls 12a on the wheel support bracket. Alternatively, the vibration dampening pads could be mounted on the side walls of the wheel support bracket with the pad faces engaging the side walls of the caster bracket, if desired. The pads are pressed in a direction perpendicular to the pad faces into engagement with the outer faces of the side walls 12a of the caster bracket to have pressurized engagement therewith and to inhibit movement of the wheel support bracket relative to the caster bracket. The pads are advantageously formed of a resilient elastomeric material and, as best shown in FIG. 3, have a generally cylindrical side wall portion 36b disposed in openings 11c (FIG. 3) in the side walls 11a of the caster bracket. The pads have a reduced head portion 36c extending between the cylindrical portion 36b and the face 36a and a clamp plate 38 overlies the outer end of each of the pads 36 and is secured as by screw fasteners 39 to the outer side of the caster bracket. The thickness of the pads is selected such that, when the clamp plates 38 are secured to the caster bracket, the pads are axially compressed into pressurized engagement with the outer face of the side walls of the wheel support bracket. The pads are preferably formed of a solid polyurethane having a hardness in the range of about 75 to 95 on the Durometer "A" scale, with a hardness of 85 preferred. The compression of the pads, and hence the frictional resistance to movement between the pad faces and the side walls of the wheel support bracket, can be varied as by varying the thickness of the pads or by the use of shims between the clamp plates and the side walls of the caster bracket. The frictional resistance to movement provided by the vibration dampening pads is selected by adjusting the compression and area of the pads to provide substantial dampening of relatively low amplitude periodic vibration applied to the caster wheel by the truck bed, but not so high as to adversely affect the shock absorbing characteristics of the suspension to relative high impact forces of a random nature on the caster wheel. Preferably, the frictional resistance to movement between the wheel support bracket and the caster bracket provided by the pads is made greater than ten percent and less than fifty percent of the load on the caster. The formation of the vibration dampening pads of resilient elastomeric material is considered to have several advantages. The resilient material can be axially compressed to pressurize the faces against the side walls of the wheel support bracket and the amount of compression can be controlled by controlling the thickness of the pad. Further, it appears that the pads dampen some very low amplitude periodic vibrations on the caster wheel through lateral elastic deformation without the pad faces sliding relative to the wheel support bracket, and that the pad faces slide relative to wheel support brackets and impose a frictional resistance to movement when the caster wheel is subjected to vibrations of an amplitude greater than that which can be absorbed by lateral deformation of the pads. The pad faces also slide relative to the wheel support brackets when the caster wheel is subjected to a relatively high impact force. Formation of the pads of resilient material such as polyurethane has been found to provide adequate dampening to inhibit resonant vibration of the wheel suspension system and the apparatus supported thereon, without substantially adversely affecting the ability of the shock absorbing wheel suspension to absorb relatively high impact forces from the wheel of the suspension.

As previously described, the shock absorbing wheel suspension can be attached either to a dolly 15 to support a load or equipment or attached directly to the equipment to provide a shock absorbing wheel suspension. The shock absorbing caster assembly allows movement of the dolly and/or the equipment carried thereby over a surface such as a floor to facilitate movement of the equipment from place to place and, during such use, the shock absorbing wheel suspension will effectively absorb impact shock supplied to the wheel 13 due to engagement with an obstruction or the like. When the shock absorbing wheel suspension is utilized to support a load or equipment during transportation on the bed of an over-the-road vehicle, the ground engaging wheels 13 rest on the bed TB of the over-the-road vehicle. The dolly or the equipment is anchored against horizontal movement relative to the vehicle in any suitable manner and may, for example, be anchored by the cargo tie-down apparatus disclosed in U.S. Pat. No. 3,066,950. Alternatively, the dolly and/or equipment can be anchored to the side walls or bed of the truck by suitable straps which allow limited vertical movement of the dolly and/or equipment while limiting horizontal movement. During transportation of the apparatus on the bed of an over-the-road vehicle, the shock absorbing apparatus remains operative to absorb impact shock transmitted by the truck bed to the wheel 13 and "G" loads transmitted by the load or equipment on the suspension apparatus. The vibration dampening pads on the caster bracket engage the side walls of the wheel support bracket and provide a frictional dampening to inhibit oscillating of the wheel support bracket relative to the caster bracket. The frictional dampening provided by the dampening pads is operative over a wide range of frequencies of the disturbing forces from the truck bed and has been found effective to inhibit build-up of resonant vibrations of the shock absorbing wheel assembly and load or equipment carried thereby during transportation on over-the-road vehicles.

The embodiments of the invention in which an exclusive property or privilege is claimed are defined as follows:

1. A shock absorbing wheel suspension for supporting mobile equipment during movement over the ground and during transport on the bed of an over-the-road vehicle comprising, mounting bracket means, means for attaching the mounting bracket means to the mobile equipment, a wheel support bracket mounted on the mounting bracket means for vertical swinging movement relative thereto about a generally horizontal pivot axis, a ground engaging wheel, means mounting the ground engaging wheel on the wheel support bracket for rotation about a generally horizontal wheel axis parallel to the pivot axis, spring means engaging the wheel support bracket and the mounting bracket means resiliently urging the wheel support bracket in a direction to press the ground engaging wheel downwardly, characterized in that one of the items comprising the mounting bracket means and the wheel support bracket have a pair of oppositely facing wall surfaces disposed in planes generally perpendicular to said pivot axis and spaced radially outwardly therefrom, a pair of vibration dampening pads each having a pad face, and means mounting the pads on the other of the items with the pad faces at locations spaced outwardly of the pivot axis to slidably engage respective ones of the oppositely facing wall surfaces and with the pads pressed in a direction perpendicular to the respective pad face into pressurized frictional engagement with a respective wall surface to dampen vertical oscillation of the wheel support bracket relative to the mounting bracket and inhibit resonant vibration of the shock absorbing wheel suspension and the equipment supported thereon during transport on the bed of an over-the-road vehicle.

2. A shock absorbing wheel suspension according to claim 1 wherein the pads are formed of a resilient material and are compressed in a direction perpendicular to the respective pad face to pressurize the pad faces into engagement with the respective wall surface.

3. A shock absorbing wheel suspension according to claim 1 wherein said oppositely facing wall surfaces are on said wheel support bracket and said vibration dampening pads are mounted on said mounting bracket means.

4. A shock absorbing wheel suspension according to claim 1 wherein said mounting bracket means includes a stationary base and a caster bracket swivelly mounted on the stationary base for movement relative thereto about a generally upright caster axis.

5. A shock absorbing wheel suspension according to claim 1 wherein the frictional resistance to movement between the wheel support bracket and the mounting bracket means provided by the pads is greater than 10% and less than 50% of the load on the wheel suspension.

6. A shock absorbing caster wheel suspension for supporting a mobile device during movement over the ground and during transport on the bed of an over-the-road vehicle comprising, a mounting base and means for attaching the mounting base to a mobile device, a caster bracket mounted on the mounting base for turning movement relative thereto about an upright caster axis, a wheel support bracket mounted on the caster bracket for swinging movement relative thereto about a generally horizontal pivot axis, a ground engaging wheel, means mounting the ground engaging wheel on the wheel support bracket for rotation about a generally horizontal wheel axis parallel to the pivot axis, spring means engaging the wheel support bracket and caster bracket resiliently urging the wheel support bracket in a diretion to press the ground engaging wheel downwardly, characterized in that one of the items comprising the mounting bracket and the caster bracket have a pair of oppositely facing wall surfaces disposed in planes generally perpendicular to said pivot axis and spaced radially outwardly thereon, a pair of vibration dampening pads each having a pad face, and means mounting the vibration pad on the other of the items with the pad faces slidably engaging respective ones of the oppositely facing wall surfaces and with the pads pressed in a direction perpendicular to the respective pad face into pressurized frictional engagement with a respective wall surface to dampen vertical oscillation of the wheel support bracket relative to the caster bracket and inhibit resonant vibration of the shock absorbing wheel suspension and the device supported thereon during transport on the bed of an over-the-road vehicle.

7. A shock absorbing caster wheel suspension according to claim 6 wherein the pads are formed of resilient material and are compressed in a direction perpendicular to the respective pad face to pressurize the pad faces into engagement with the respective wall surface.

8. A shock absorbing caster wheel suspension according to claim 6 wherein said oppositely facing wall surfaces are on said wheel support bracket and said vibration dampening pads are mounted on said caster bracket.

9. A shock absorbing caster wheel suspension according to claim 8 wherein the pads are formed of resilient material and are compressed in a direction perpendicular to the respective pad face to pressurize the pad faces into engagement with the respective wall surface.

10. A shock absorbing caster wheel suspension according to claim 6 wherein said caster bracket includes spaced side walls having said oppositely facing wall surfaces thereon spaced outwardly from said pivot axis, said mounting bracket having spaced side walls, and means mounting the vibration dampening pads on the side walls of the mounting bracket means at locations to engage said oppositely facing wall surfaces.

11. A shock absorbing caster wheel suspension according to claim 10 wherein said spaced side walls of said caster bracket each have an opening extending therethrough, said pads each comprising a block of resilient material disposed in said opening and having said pad faces at one end, and a clamp plate attached to each side wall of the caster bracket and extending across the opening therein for engaging the end of said block remote from the pad faces thereon.

12. A shock absorbing caster wheel suspension according to claim 6 wherein the frictional resistance to movement between the wheel suspension bracket and the caster bracket provided by the pads is greater than 10% and less than 50% of the load on the caster wheel suspension.

* * * * *